US006590508B1

(12) United States Patent
Howell et al.

(10) Patent No.: US 6,590,508 B1
(45) Date of Patent: Jul. 8, 2003

(54) BACKLIT KEYBOARD

(76) Inventors: Bryan F. Howell, 1407 Elton La., Austin, TX (US) 78703; Sean P. O'Neal, 8017 Manx Dr., Round Rock, TX (US) 78681

( * ) Notice: Subject to any disclaimer, the term of this patent is extended or adjusted under 35 U.S.C. 154(b) by 0 days.

(21) Appl. No.: 09/317,543

(22) Filed: May 24, 1999

(51) Int. Cl.[7] .................................................. H01H 9/00
(52) U.S. Cl. .......................... 341/22; 200/5 A; 200/314; 200/317; 362/23; 362/26; 362/84; 362/30; 345/170
(58) Field of Search ...................... 341/22, 20; 345/168, 345/170; 200/314, 317, 5 A; 313/509; 362/84, 23, 26, 30

(56) References Cited

U.S. PATENT DOCUMENTS

| 4,060,703 | A | | 11/1977 | Everett, Jr. .................. 200/5 A |
| 4,320,268 | A | * | 3/1982 | Brown ........................ 200/314 |
| 4,449,024 | A | | 5/1984 | Stracener .................... 200/314 |
| 4,489,227 | A | | 12/1984 | Larmarche .................. 200/314 |
| 4,670,633 | A | | 6/1987 | Kaiwa et al. ................ 200/314 |
| 4,806,908 | A | | 2/1989 | Krupnik ........................ 341/22 |
| 4,811,175 | A | * | 3/1989 | DeSmet ....................... 200/313 |
| 5,504,390 | A | | 4/1996 | Topp ............................ 313/509 |
| 5,573,807 | A | | 11/1996 | LaPointe ...................... 427/66 |
| 5,598,058 | A | | 1/1997 | LaPointe ...................... 313/503 |
| 5,612,692 | A | | 3/1997 | Dugas et al. .................. 321/22 |
| 5,726,953 | A | | 3/1998 | LaPointe et al. ............... 368/87 |
| 5,926,119 | A | * | 7/1999 | Linderman et al. ............ 341/22 |
| 6,127,961 | A | * | 10/2000 | Stacy et al. ............ 340/825.69 |
| 6,217,183 | B1 | * | 4/2001 | Shipman ..................... 200/314 |
| 6,259,044 | B1 | * | 7/2001 | Paratore et al. ............. 200/310 |
| 6,284,988 | B1 | * | 9/2001 | Watanabe et al. ........... 200/314 |

\* cited by examiner

*Primary Examiner*—Michael Horabik
*Assistant Examiner*—Albert K. Wong

(57) ABSTRACT

A portable computer system includes an illuminated keyboard. The computer system has an enclosure including a base and a cover pivotally attached to the base. The keyboard subassembly is mounted in the base. The keyboard subassembly includes a plurality of key mechanisms mounted on a first side thereof. A light panel having a plurality of openings formed therethrough in a pattern generally corresponding to the plurality of key mechanisms is provided. The light panel is mounted adjacent the first side of the keyboard subassembly with each one of the key mechanisms extending through a respective opening in the light panel. A key cap is mounted on each one of the key mechanisms. In one embodiment, each key cap includes a body formed of a non-opaque material having an opaque character indicia portion formed thereon. Light is transmitted through body such that the character indicia portion may be viewed in low light conditions. The key cap may include a light diffuser to enhance the projection of light from the light panel to the character indicia portion.

21 Claims, 5 Drawing Sheets

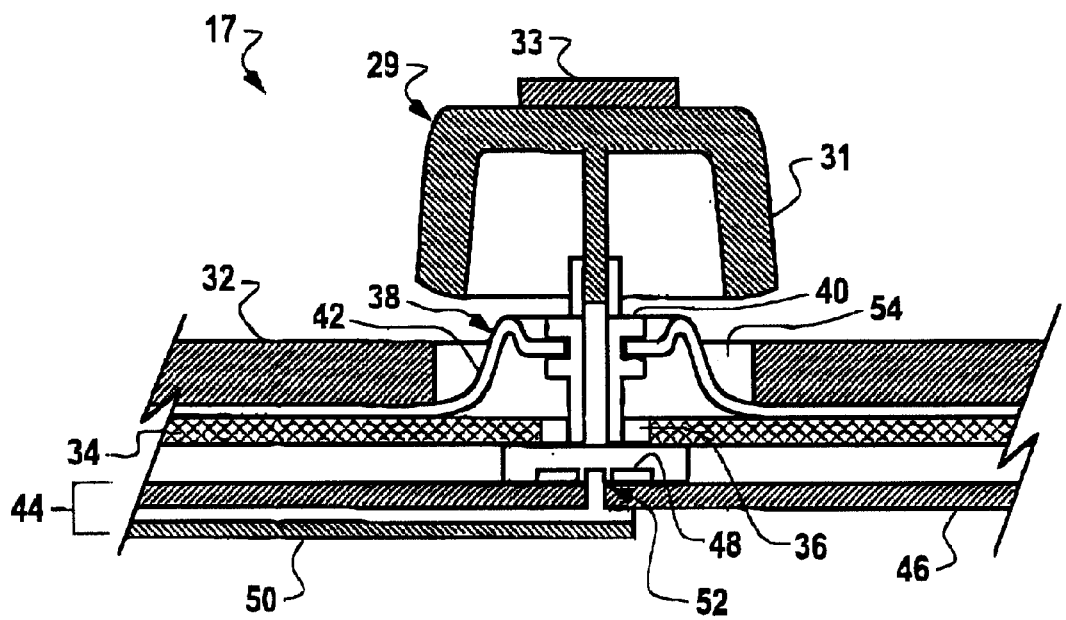
*Fig. 3*
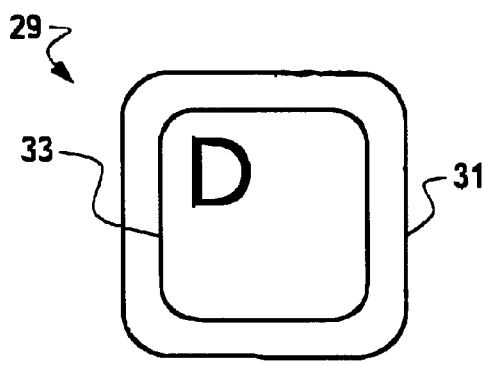
*Fig. 4*
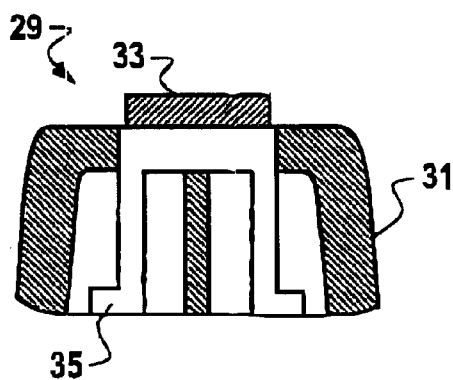    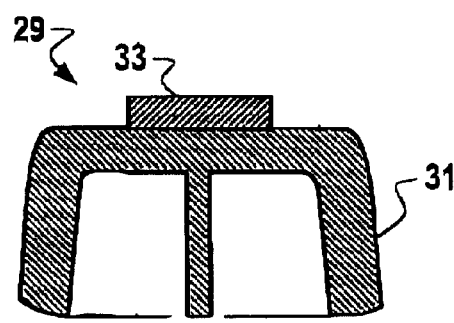
*Fig. 5A*                *Fig. 5B*

BACKLIT KEYBOARD

BACKGROUND

The disclosures herein relate generally to computer systems and more particularly to backlit keyboards for portable computer systems.

Portable computer systems are often used in low light situations. In these situations, it is very easy to read information shown on the video display. However, it is quite difficult to see the keys of the keyboard. This presents a fairly significant problem for computer users who rely on visually identifying specific keys to achieve adequate typing proficiency.

Various types of illuminated keyboards have been attempted. However, they have provided only limited success. Some of these keyboards use one or more light diffusers that require several discrete light sources to provide uniform lighting across the area of the keyboard. Other types of illuminated keyboards use electroluminescent lighting components that are integral with construction of the keyboard. Because the electro-luminescent lighting and the keyboard components are manufactured as a single assembly, the functionality of the keyboard and the lighting system are dependent on each other. In these types of constructions, issues associated with yield can cause the cost of the keyboard to be prohibitive for use in cost sensitive applications.

U.S. Pat. No. 4,060,703 discloses a sandwich-type computer keyboard with keys characterized by a tactility to provide a positive degree of tactile feedback to an operator and having an electro-luminescent panel for illuminating the keyboard panel. The electro-luminescent panel is disclosed to be an integral portion of the keyboard.

U.S. Pat. No. 4,449,024 discloses a backlit keyboard including a printed circuit board on which is mounted in a central location a single lamp. The single lamp is replaceable from the backside of the board and extends into a clear plastic light diffuser over which an overlay is disposed. A bezel is provided to define key areas in the translucent overlay such that the single lamp disperses light energy through the diffuser to light up the entire overlay. The single lamp is mounted in a socket formed in the printed circuit board.

U.S. Pat. No. 4,489,227 discloses a keyboard having a side-lighted transparent support plane. The support plane includes a plurality of light-pipes vertically projecting therefrom through an overlying foam over-travel pad. A pair of patterned membrane switch layers, separated by a low density foam spacer, overly the over-travel pad and are positioned relative to a plurality of key-caps slidably mounted to the light-pipes.

U.S. Pat. No. 4,670,633 discloses a keyboard capable of illuminating push buttons with a small number of discrete light sources. The light sources are randomly distributed below a grating-like retainer provided for retaining push buttons of the keyboard. Light rays from the light sources are reflected by means of pyramidal reflectors disposed above the light sources.

U.S. Pat. No. 4,806,908 discloses a keyboard having a plurality of keys that are mounted in parallel columns on a key supporting panel. Each key includes a translucent core having a legend on its upper end, a conductor on its lower end, and an opening therethrough intermediate its ends. Each core is mounted for reciprocation at its lower end in a plastic sleeve. An elongated electro-luminescent strip extends through the an opening in each column to prevent accidental withdrawal of the keys, and to illuminate the legends on a column of keys when energized.

Accordingly, there is a need for a backlit keyboard that provides uniform illumination and that has a keyboard portion and an illumination portion that are separately manufactured as functional subassemblies.

SUMMARY

One embodiment, accordingly, provides a keyboard having separately manufactured keyboard and illumination subassemblies having individual functionality which is not dependent on the integration of the two subassemblies. To this end, one embodiment provides an illuminated keyboard including a keyboard subassembly having a plurality of key mechanisms mounted on a first side thereof. A light panel having a plurality of openings formed therethrough in a pattern generally corresponding to the plurality of key mechanisms is provided. The light panel is mounted adjacent the first side of the keyboard subassembly with each one of the key mechanisms extending through a respective opening in the light panel. A key cap is attached to each one of the key mechanisms.

A principle advantage of a keyboard according to the embodiments presented herein is that the entire area of the keyboard is more uniformly illuminated than prior attempts at illuminating keyboards.

BRIEF DESCRIPTION OF THE DRAWING FIGURES

FIG. 3 is a cross sectional view taken at line 3—3 in FIG. 1.

FIG. 4 is a top view of the key cap illustrated in FIG. 3.

FIG. 5A is a cross sectional view illustrating an embodiment of a key cap having a light diffuser.

FIG. 5B is a cross sectional view illustrating an embodiment of a key cap having non-opaque and opaque regions.

DETAILED DESCRIPTION

Figure 1:
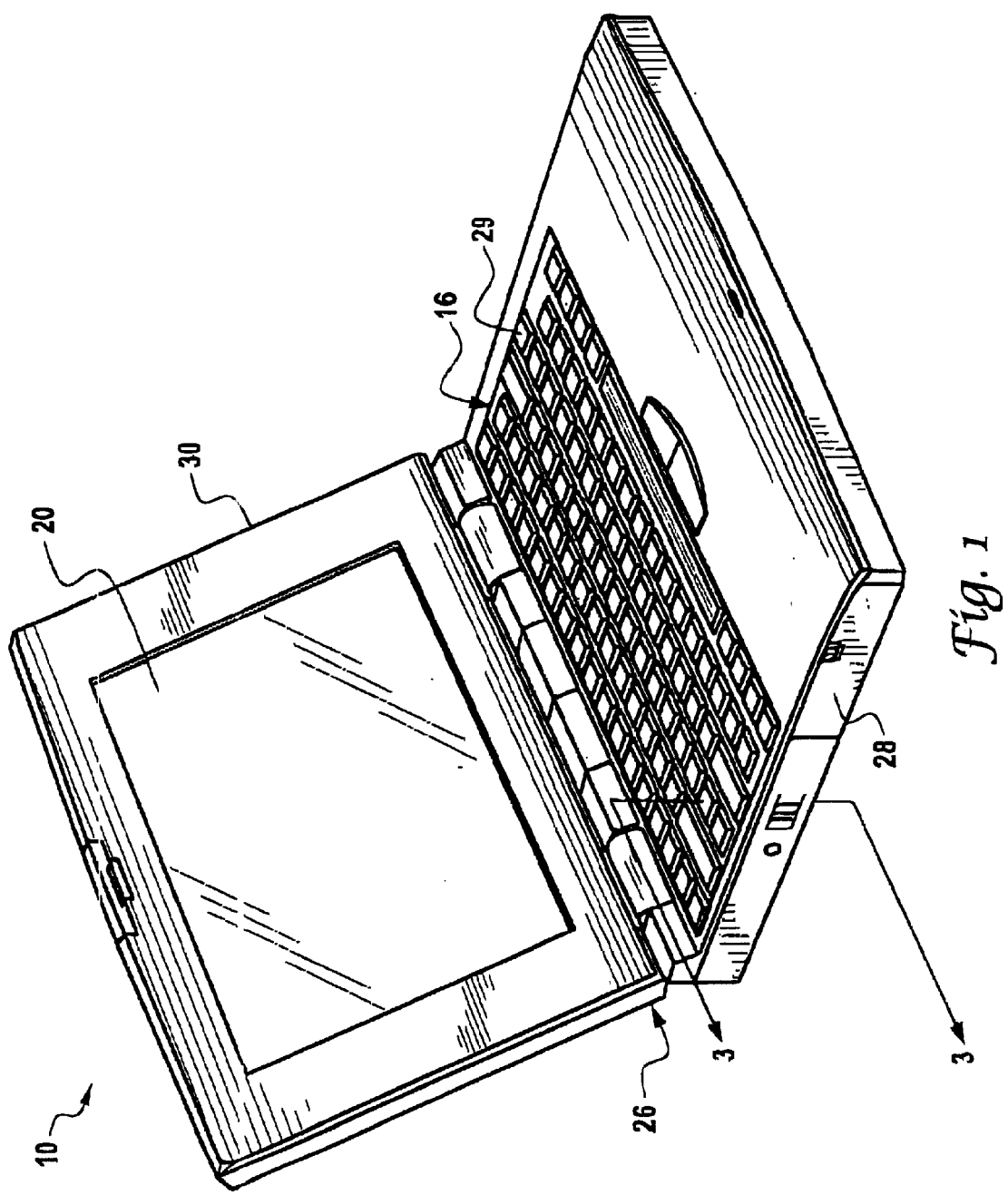
FIG. 1 is a perspective view illustrating an embodiment of a computer system.
Figure 2:
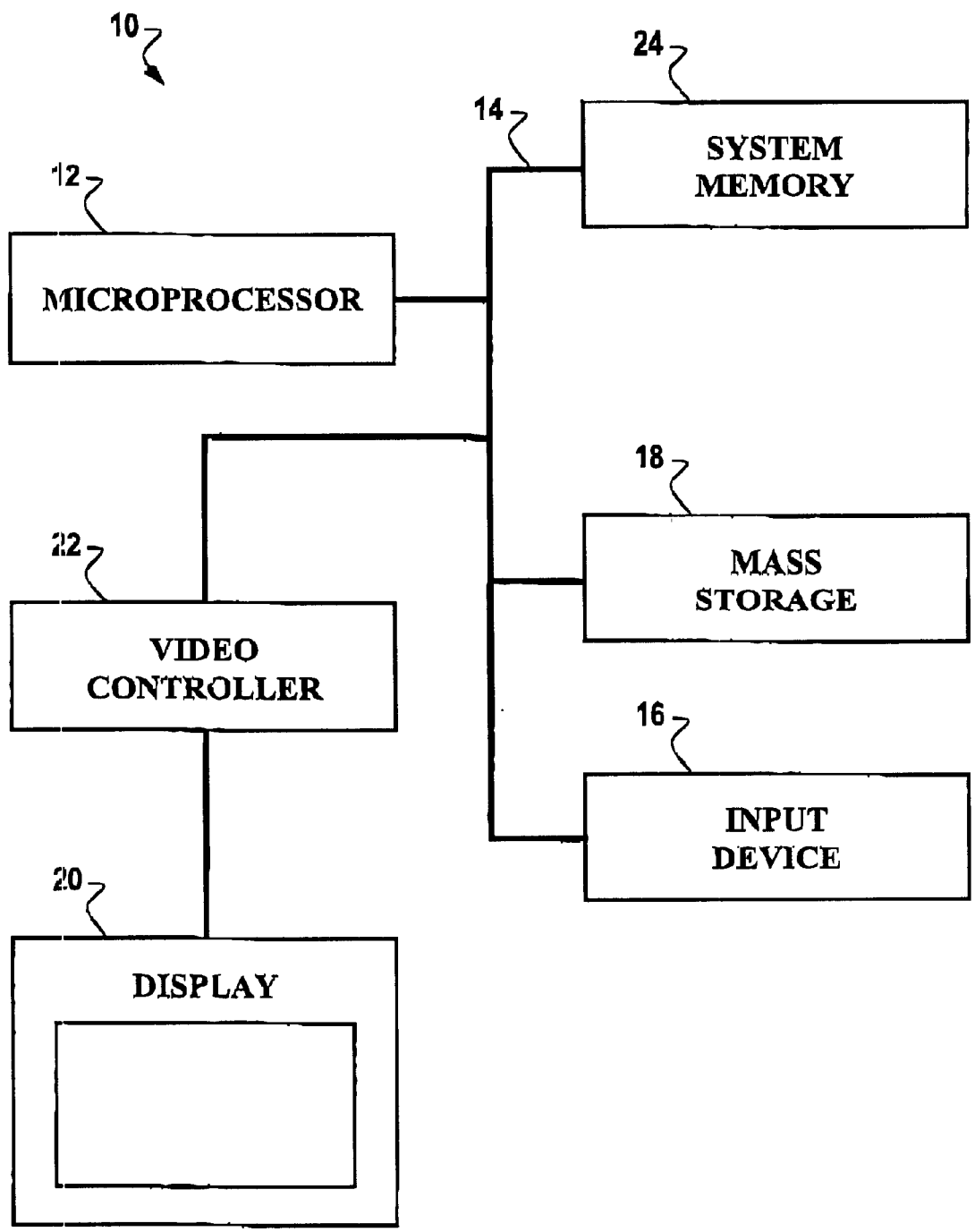
FIG. 2 is a block diagram illustrating an embodiment of a computer system.

FIGS. 1 and 2 illustrate an embodiment of a computer system 10, indicated generally at 10. The computer system 10 includes at least one microprocessor 12. The microprocessor 12 is connected to a bus 14. The bus 14 serves as a connection between the microprocessor 12 and other components of the computer system 10. An input device such as keyboard 16 is coupled to the microprocessor 12 to provide input to the microprocessor 12. The keyboard 16 typically includes a keyboard subassembly having a plurality of attached key caps. Examples of input devices include keyboards, touchscreens, and pointing devices such as a mouse, a trackball and a trackpad. The computer system 10 further includes a display 20 which is coupled to the microprocessor 12 typically by a video controller 22. Programs and data are stored on a mass storage device 18 which is coupled to the microprocessor 12. Mass storage devices include components such as hard disks, optical disks, magneto-optical drives, floppy drives, and the like. A system memory 24 provides the microprocessor 12 with fast storage to facilitate execution of computer programs by the microprocessor 12. It should be understood that other busses and intermediate circuits can be employed between the components described above and microprocessor 12 to facilitate interconnection between the components and the microprocessor.

The computer system 10 includes a enclosure 26 including a base 28 and a cover 30. The keyboard 16 is mounted in the case base 28 and the display 20 is mounted in the cover 30. The cover 30 is pivotally attached to the base 28 allowing the cover 30 to be moved between an open and a closed position.

FIG. 3 illustrates an embodiment of a keyboard subassembly 17 having an attached light panel 32. The light panel 32 may be a commercially available electro-luminescent panel such as that offered by Metro-Mark, Incorporated of Minnetonka, Minn. The light panel 32 is disposed between the keyboard subassembly 17 and a plurality of key caps 29. The light panel 32 may be activated to illuminate to facilitate visual inspection of the key caps 29 during low-light use conditions.

Keyboard subassemblies 17 of various types of construction are commercially available through a number of sources such as Alps Keyboards. The embodiment of a keyboard subassembly 17 illustrated in FIG. 3 includes a support member 34 having a plurality of apertures 36 formed through it. A key mechanism 38 is mounted adjacent a first side of the support member 34, extending through each aperture 36 in the support member 34. Each key mechanism 38 includes a shaft 40 that carries a key cap 29. A resilient member 42 is attached the shaft 40 for biasing the shaft to an idle position. In the illustrative embodiment, the shaft 40 is an electrically conductive material and the resilient member 42 is an insulating material.

A printed circuit substrate 44 is mounted adjacent a second side of the support member 34. The printed circuit substrate 44 includes a dielectric layer 46 having a first conductive layer 48 formed on a first side of the dielectric layer 46 adjacent the support member 34. A second conductive layer 50 is formed on a second side of the dielectric layer 46 opposite the first side. The conductive layers 48, 50 and the dielectric layer 46 are patterned to form a plurality of contacts 52. During operation of the keyboard 16, depressing a key cap 29 moves the shaft 40 to an active position in which the shaft 40 engages the respective contact 52, establishing a signal corresponding to the key cap 29 being depressed.

As illustrated in FIGS. 3 and 4, each key cap 29 may include body 31 having a character indicia portion 33. The body 31 and the character indicia portion 33 are both opaque, but of different colors. The character indicia portion 33 may represent letters, numbers, and special symbols. With the light panel 32 illuminated during low light conditions, the light from the light panel 32 emanates from beneath the key caps 29, enabling the pattern of the character indicia portion 33 to be viewed. In this embodiment, light is not transmitted through the keys caps 29. The character indicia portion 33 of each key cap 29 is illuminated by virtue of the general area of the keyboard 16 being illuminated by the light panel 32.

FIG. 5A illustrates an embodiment of a key cap 29 having an opaque body 31, an opaque character indicia portion 33 and a light diffuser 35. The character indicia portion 33 is formed on the light diffuser 35 such that the light diffuser 35 provides a background for the character indicia portion 33. With the light panel 32 illuminated during low light conditions, the light from the light panel 32 is channeled through the light diffuser 35, thus enabling the character indicia portion 33 to be visible against the illuminated light diffuser 35.

FIG. 5B illustrates an embodiment of a key cap 29 that includes a body 31 that is non-opaque and a character indicia portion 33 that is opaque. With the light panel 32 illuminated during low light conditions, the light from the light panel 32 is transmitted through the body 31. However, light is not transmitted through the character indicia portion 33, thus enabling the pattern of the character indicia portion 33 to be visible against the illuminated body 31.

Figure 6:
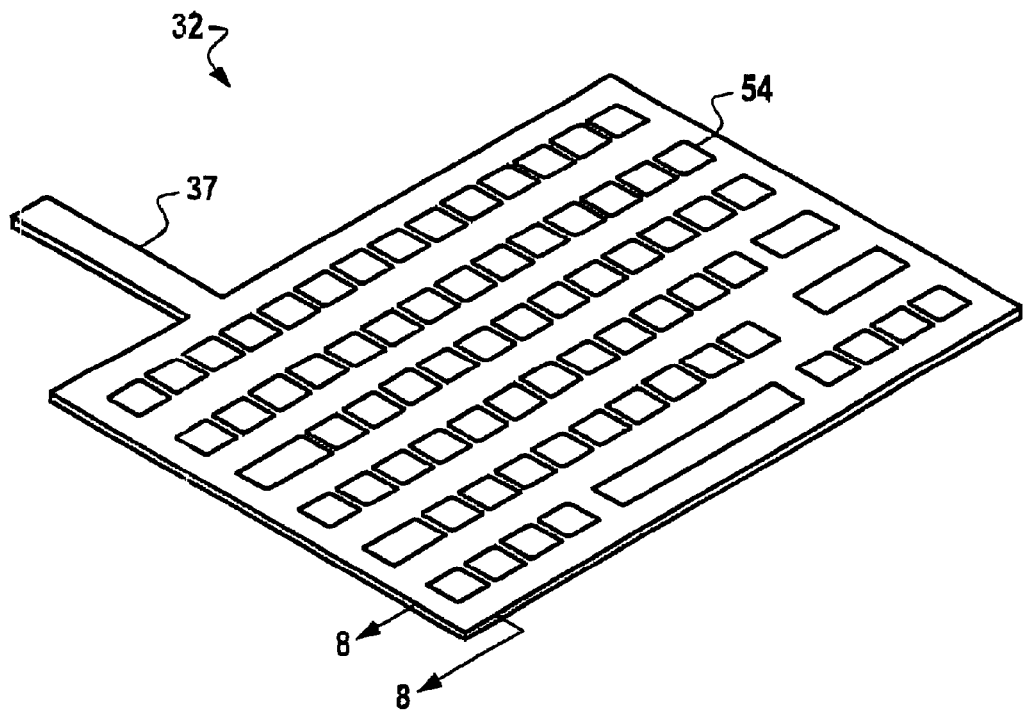
FIG. 6 is a perspective view illustrating an embodiment of a light panel.
Figure 7:
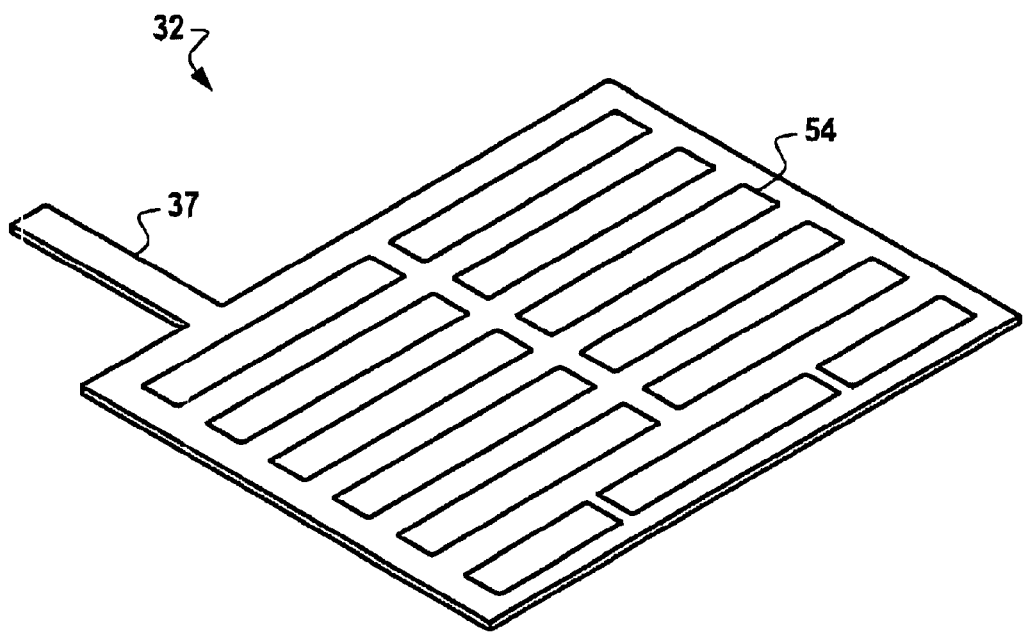
FIG. 7 is a perspective view illustrating another embodiment of a light panel.

FIGS. 6 and 7 illustrate two embodiments of an electro-luminescent-type light panel 32. FIG. 6 illustrates an embodiment of a light panel 32 having a cut-out 54 corresponding to each key cap 29. In this embodiment, light is supplied around the perimeter of each key cap 29, enhancing the uniformity of the illumination. FIG. 7 illustrates an embodiment of a light panel 32 having a cut out 54 for a group of key caps 29. In this embodiment, each cut-out 54 encompasses a plurality of key caps 29 rather than a single key cap. In both embodiments, a lead 37 is provided for connecting the light panel 32 to a suitable power source such as an alternating current (AC) power supply.

Figure 8:
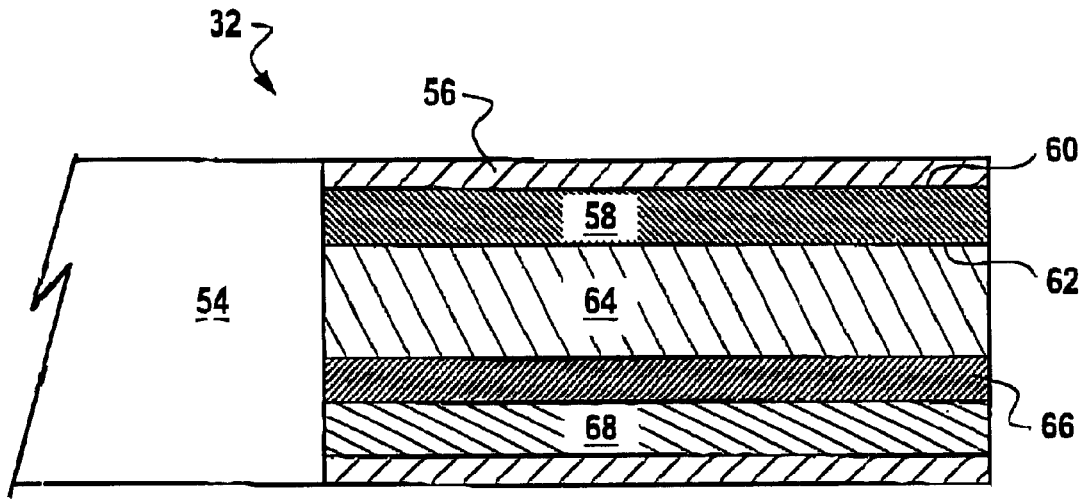
FIG. 8 is a cross sectional view taken at line 6—6 in FIG. 5.

Now referring to FIG. 8, the cross-section of an embodiment of an electro-luminescent-type light panel is illustrated. The light panel 32 is formed on a polymer substrate 56 such as a polyester film. A transparent conductive layer such as indium tin oxide is formed on the polymer substrate 56, establishing a front electrode 58. The front electrode 58 has a first surface 60 and a second surface 62. The first surface 60 of the front electrode 58 is affixed to the polymer substrate 56.

The front electrode 58 is coextensive with the polymer substrate 56. This means that the front electrode 58 overlays substantially the entire surface of the polymer substrate 56. In the embodiments shown, all of the subsequently deposited layers have a similar co-extensive relationship with the adjacent layers. However, it will be appreciated that in other embodiments not shown, it may be desirable to form one or more layers that are not co-extensive with the adjacent layers.

A layer of electro-luminescent material 64 is formed on the second surface 62 of the front electrode 58. The electro-luminescent material 64 may include a material such as phosphor mixed with a polymeric binder. Materials such as copper-activated or copper-manganese-activated zinc sulfide are suitable.

A dielectric layer 66 is formed over the electro-luminescent material 64. It is desirable for the dielectric layer 66 to be formed from a material having a high dielectric constant K such as barium titanate. The dielectric layer 66 is an insulating layer, enabling higher potential to be maintained across the layer of electro-luminescent material 64, intensifying its illumination. It is preferred that the dielectric layer 66 is co-extensive with the layer of electro-luminescent material 64.

A second conductive layer such as indium tin oxide is formed on the dielectric layer 66 establishing a back electrode 68. The back electrode 68 is co-extensive with the dielectric layer 66. The front electrode 58 and the back electrode 68 are connected to an AC power supply through the lead 37 illustrated in FIGS. 6 and 7 for maintaining a predetermined potential across the front and back electrodes 58, 68.

Figure 9:
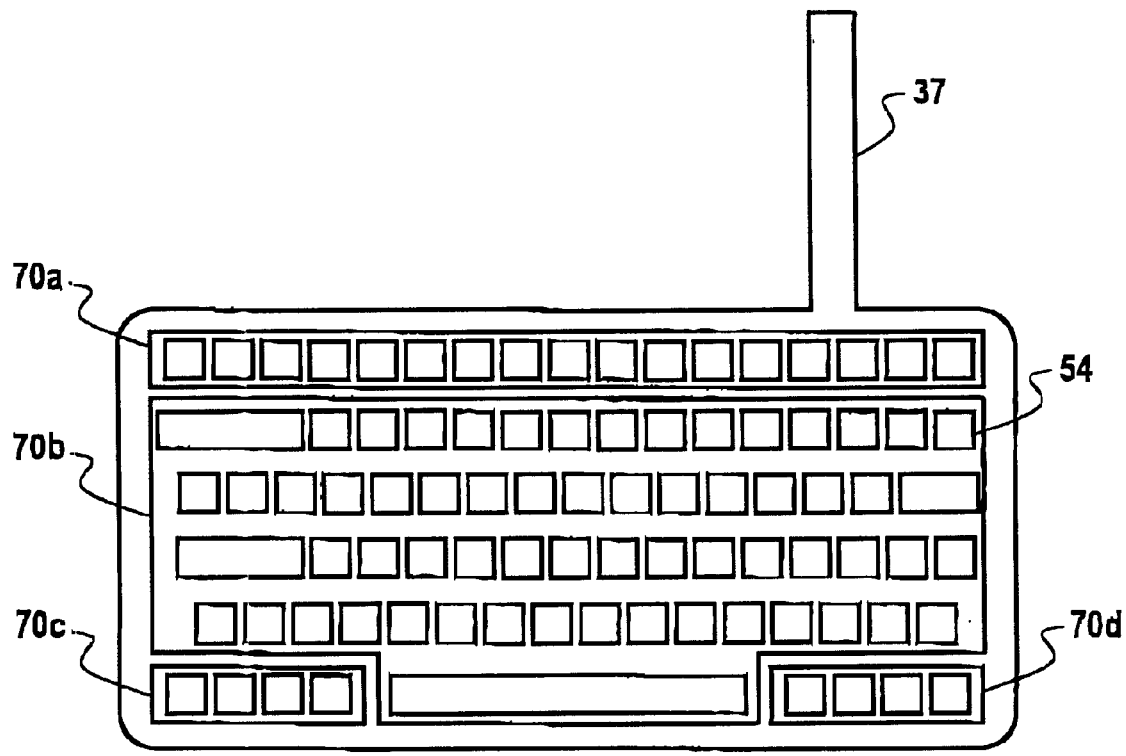
FIG. 9 is a perspective view illustrating an embodiment of a light panel having a plurality of lighting segments.

FIG. 9 illustrates an embodiment of a light panel 32 having a plurality of discrete lighting sections 70a–70d. The various lighting sections 70a–70d may provide different functional characteristics such as different color illumination, different intensity of illumination and the like. The various lighting sections 70a–70d may also be used in a fashion allowing certain sections to be independently turned on and off as needed during low-light use conditions.

In operation, during low-light use conditions, a light panel is energized with an alternating current resulting in the emanation of light from the light panel. Each key cap includes a character indicia portion that is illuminated by the light panel. The character indicia may be a letter, number, or special symbol. The character indicia portion is illuminated by the light panel to allow a computer operator to visually identify a particular key in low-light conditions.

As a result, one embodiment provides an illuminated keyboard including a keyboard subassembly having a plurality of key mechanisms mounted on a first side thereof. A light panel having a plurality of openings formed therethrough in a pattern generally corresponding to the plurality of key mechanisms is provided. The light panel is mounted adjacent the first side of the keyboard subassembly with each one of the key mechanisms extending through a respective opening in the light panel. A key cap is attached to each one of the key mechanisms.

Another embodiment provides a portable computer system including an enclosure having a base and a cover pivotally attached to the base. The keyboard subassembly is mounted in the base. The keyboard subassembly includes a plurality of key mechanisms mounted on a first side thereof. A light panel having a plurality of openings formed therethrough in a pattern generally corresponding to the plurality of key mechanisms is provided. The light panel is mounted adjacent the first side of the keyboard subassembly with each one of the key mechanisms extending through a respective opening in the light panel. A key cap is mounted on each one of the key mechanisms.

Yet another embodiment provides a computer system including a microprocessor and a keyboard subassembly coupled to provide input to the microprocessor. The keyboard subassembly includes a plurality of key mechanisms mounted on a first side thereof. A mass storage is coupled to the microprocessor and a display is coupled to the microprocessor by a video controller. A system memory is coupled to provide storage to facilitate execution of computer programs by the microprocessor. A light panel having a plurality of openings formed therethrough in a pattern generally corresponding to the plurality of key mechanisms is provided. The light panel is mounted adjacent the first side of the keyboard subassembly with each one of the key mechanisms extending through a respective opening in the light panel. A key cap is mounted on each one of the key mechanisms.

As it can be seen, the embodiments presented herein provide several advantages. The yield of the separately manufactured keyboard and illumination subassemblies is greater than the yield of a fully integrated illuminated keyboard subassembly. The electro-luminescent light panel is capable of providing more uniform lighting across the entire area of the keyboard. The illumination assembly can be constructed to function with existing keyboard subassemblies having modified key caps including an opaque portion and a translucent portion.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An illuminated keyboard, comprising:
   a keyboard subassembly including a plurality of key mechanisms mounted on a first side thereof;
   a light panel having a plurality of openings formed therethrough in a pattern generally corresponding to the plurality of key mechanisms, the light panel mounted adjacent the first side of the keyboard subassembly with each one of the key mechanisms extending through a respective opening in the light panel; and
   a key cap attached to each one of the key mechanisms.

2. The illuminated keyboard of claim 1 wherein a character indicia portion is formed on each key cap, the character indicia portion being formed of a non-opaque material.

3. The illuminated keyboard of claim 1 wherein the light panel is flexible.

4. The illuminated keyboard of claim 1 wherein the light panel is an electro-luminescent type light panel.

5. The illuminated keyboard of claim 1 wherein each key cap has a non-opaque portion and an opaque portion.

6. The illuminated keyboard of claim 5 wherein the non-opaque portion of the key caps is translucent.

7. The illuminated keyboard of claim 5 wherein the opaque portion of the key caps is formed in the shape of a character indicia.

8. The illuminated keyboard of claim 5 wherein the non-opaque portion of the key caps is formed in the shape of a character indicia.

9. The illuminated keyboard of claim 1 wherein the light panel is removably mounted to the keyboard subassembly.

10. The illuminated keyboard of claim 2 wherein each key cap includes an integral light diffuser.

11. The illuminated keyboard of claim 10 wherein the light diffuser is adjacent the non-opaque portion of the key cap.

12. The illuminated keyboard of claim 1 wherein the light panel includes a plurality of lighting regions having a first lighting region providing a first color of light and a second lighting region providing a second color of light different from the first color.

13. The illuminated keyboard of claim 1 wherein the light panel includes a plurality of lighting regions having a first lighting region providing a first intensity of light and a second lighting region providing a second intensity of light different from the first intensity.

14. A portable computer system, comprising:
   an enclosure including a base and a cover pivotally attached to the base;
   a keyboard subassembly mounted in the base, the keyboard subassembly including a plurality of key mechanisms mounted on a first side thereof;
   a light panel having a plurality of openings formed therethrough in a pattern generally corresponding to the plurality of key mechanisms, the light panel mounted adjacent the first side of the keyboard subassembly with each one of the key mechanisms extending through a respective opening in the light panel; and a key cap mounted on each one of the key mechanisms.

15. The illuminated keyboard of claim 14 wherein the light panel is an electro-luminescent type light panel.

16. The illuminated keyboard of claim 14 wherein the light panel is removably mounted to the keyboard subassembly.

17. The illuminated keyboard of claim 14 wherein each key cap includes an integral light diffuser.

18. A computer system, comprising:

a microprocessor;

a keyboard subassembly coupled to provide input to the microprocessor, the keyboard subassembly including a plurality of key mechanisms mounted on a first side thereof;

a mass storage coupled to the microprocessor;

a display coupled to the microprocessor by a video controller;

a system memory coupled to provide storage to facilitate execution of computer programs by the microprocessor;

a light panel having a plurality of openings formed therethrough in a pattern generally corresponding to the plurality of key mechanisms, the light panel mounted adjacent the first side of the keyboard subassembly with each one of the key mechanisms extending through a respective opening in the light panel; and a key cap mounted on each one of the key mechanisms.

19. The illuminated keyboard of claim 18 wherein the light panel is an electro-luminescent type light panel.

20. The illuminated keyboard of claim 18 wherein the light panel is removably mounted to the keyboard subassembly.

21. The illuminated keyboard of claim 18 wherein each key cap includes an integral light diffuser.

\* \* \* \* \*